US012112873B2

(12) United States Patent
Tsutsui et al.

(10) Patent No.: US 12,112,873 B2
(45) Date of Patent: Oct. 8, 2024

(54) COIL COMPONENT

(71) Applicant: TDK Corporation, Tokyo (JP)

(72) Inventors: Hidenori Tsutsui, Tokyo (JP); Kouji Kawamura, Tokyo (JP); Hiromu Sakamoto, Tokyo (JP); Kengo Osada, Tokyo (JP); Takuro Tsuruta, Tokyo (JP); Takeshi Okumura, Tokyo (JP)

(73) Assignee: TDK Corporation, Tokyo (JP)

( * ) Notice: Subject to any disclaimer, the term of this patent is extended or adjusted under 35 U.S.C. 154(b) by 477 days.

(21) Appl. No.: 17/486,196

(22) Filed: Sep. 27, 2021

(65) Prior Publication Data

US 2022/0102043 A1 Mar. 31, 2022

(30) Foreign Application Priority Data

Sep. 28, 2020 (JP) ................................ 2020-162537

(51) Int. Cl.
*H01F 17/00* (2006.01)
*H01F 27/29* (2006.01)

(52) U.S. Cl.
CPC ....... *H01F 17/0013* (2013.01); *H01F 27/292* (2013.01); *H01F 2017/0073* (2013.01); *H01F 2017/0093* (2013.01)

(58) Field of Classification Search
CPC ............... H01F 17/0013; H01F 27/292; H01F 2017/0073; H01F 2017/0093
See application file for complete search history.

(56) References Cited

U.S. PATENT DOCUMENTS 7,843,701 B2 * 11/2010 Kudo .................... H01F 27/027 336/200
2012/0133472 A1 * 5/2012 Nishikawa .............. H01F 17/04 336/200
2013/0154770 A1 6/2013 Lee et al.
2014/0292466 A1 * 10/2014 Watanabe ............... H01F 27/29 205/118

FOREIGN PATENT DOCUMENTS

CN 107103989 A * 8/2017 ......... H01F 27/2871
JP 2001-250723 A 9/2001
JP 2005150137 A * 6/2005
JP 2007059539 A * 3/2007

(Continued)

*Primary Examiner* — Malcolm Barnes
(74) *Attorney, Agent, or Firm* — Rimon P.C.

(57) ABSTRACT

Disclosed herein is a coil component that includes first, second, third, and fourth terminal electrodes; a first planar spiral coil formed on a substrate, the first planar spiral coil having an outer peripheral end connected to the first terminal electrode; a second planar spiral coil stacked on the first planar spiral coil through a first insulating layer, the second planar spiral coil having an outer peripheral end connected to the second terminal electrode; and first and second lead-out patterns stacked on the second planar spiral coil through a second insulating layer. The first lead-out pattern connects the third terminal electrode and an inner peripheral end of the first planar spiral coil. The second lead-out pattern connects the fourth terminal electrode and an inner peripheral end of the second planar spiral coil. The second insulating layer is thicker than the first insulating layer.

13 Claims, 7 Drawing Sheets

(56) References Cited

FOREIGN PATENT DOCUMENTS

| | | | |
|---|---|---|---|
| JP | 2012-160506 | A | 8/2012 |
| JP | 2016-048725 | A | 4/2016 |
| JP | 6303123 | B2 | 4/2018 |
| JP | 6427770 | B2 | 11/2018 |
| WO | 2013027577 | A1 | 2/2013 |

* cited by examiner

COIL COMPONENT

BACKGROUND OF THE INVENTION

Field of the Invention

The present invention relates to a coil component and, more particularly, to a coil component that functions as a common mode filter.

Description of Related Art

Common mode filters are electronic components for removing common mode noise superimposed on a differential signal transmission line and are widely used in many electronic devices. Japanese Patent Nos. 6,303,123 and 6,427,770 each disclose a common mode filter having a structure in which four planar spiral coils are stacked. The first and third planar spiral coils are connected in series to constitute one line, while the second and fourth planar spiral coils are connected in series to constitute the other line.

However, in the common mode filters described in Japanese Patent Nos. 6,303,123 and 6,427,770, high-frequency characteristics, particularly, mode conversion characteristics (Scd21) involving conversion of a differential signal component into a common mode noise component deteriorate due to floating capacitance generated between the second and third planar spiral coils. To mitigate this problem, in Japanese Patent Nos. 6,303,123 and 6,427,770, an insulating layer positioned between the second and third planar spiral coils is increased in thickness; however, even in this case, the floating capacitance generated between planar spiral coils in second and third layers cannot be reduced to zero.

SUMMARY

It is therefore an object of the present invention to prevent deterioration in high-frequency characteristics due to floating capacitance in a coil component functioning as a common mode filter.

A coil component according to the present invention includes: first, second, third, and fourth terminal electrodes; a first planar spiral coil formed on a substrate and whose outer peripheral end is connected to the first terminal electrode; a second planar spiral coil stacked on the first planar spiral coil through a first insulating layer and whose outer peripheral end is connected to the second terminal electrode; and first and second lead-out patterns stacked on the second planar spiral coil through the second insulating layer. The first lead-out pattern connects the third terminal electrode and the inner peripheral end of the first planar spiral coil. The second lead-out pattern connects the fourth terminal electrode and the inner peripheral end of the second planar spiral coil. The second insulating layer is thicker than the first insulating layer.

The coil component according to the present invention has a structure in which two planar spiral coils are stacked, so that floating capacitance is reduced as compared with a coil component having a structure in which four planar spiral coils are stacked. In addition, the second insulating layer is thicker than the first insulating layer, so that also floating capacitance generated between the second planar spiral coil and the first and second lead-out patterns is reduced. As a result, it is possible to enhance high-frequency characteristics such as mode conversion characteristics as compared with conventional coil components.

In the present invention, each of the first and second planar spiral coils may be larger in thickness than width. This allows a sufficient number of turns and a sufficient cross-sectional area to be ensured even in the two-coil stacked structure.

In the present invention, each of the first and second lead-out patterns may be larger in thickness than width. This can further reduce the floating capacitance generated between the second planar spiral coil and the first and second lead-out patterns.

In the present invention, the thickness of the second insulating layer may be 1.2 times as large as or larger than the thickness of the first insulating layer. This can further reduce the floating capacitance generated between the second planar spiral coil and the first and second lead-out patterns.

In the present invention, the second insulating layer may have a dielectric constant lower than that of the first insulating layer. This can further reduce the floating capacitance generated between the second planar spiral coil and the first and second lead-out patterns.

As described above, according to the present invention, floating capacitance is reduced in a coil component functioning as a common mode filter, allowing enhancement of high-frequency characteristics.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
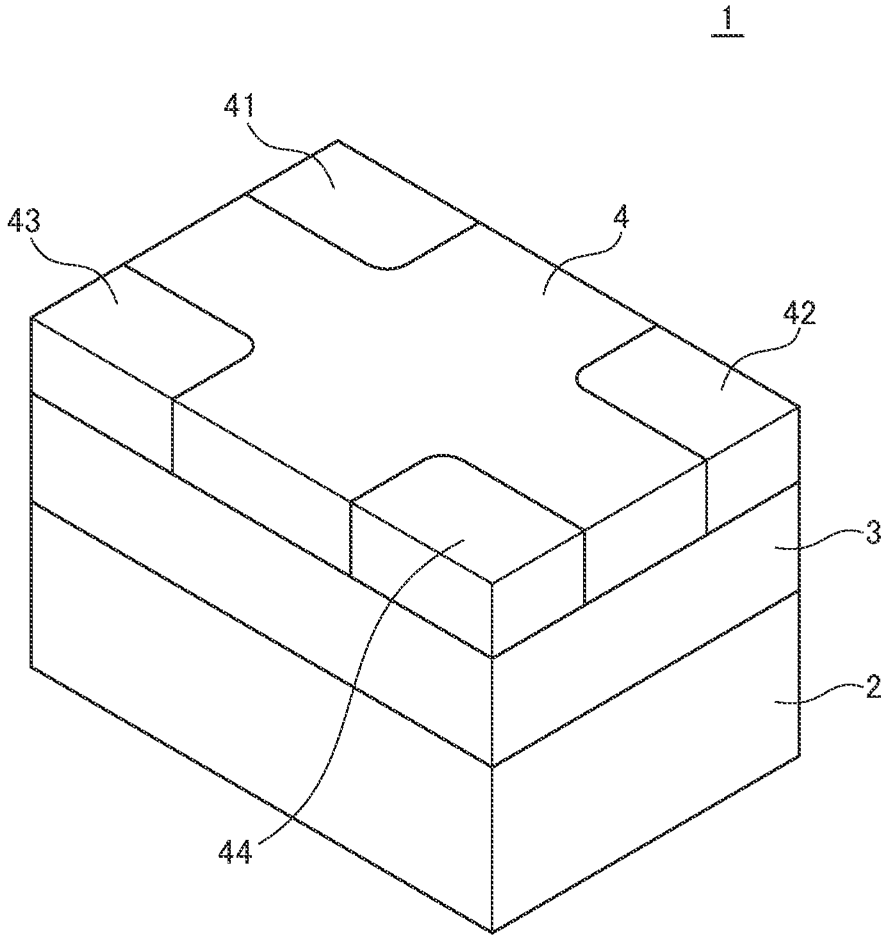
FIG. 1 is a schematic perspective view illustrating the outer appearance of a coil component 1 according to an embodiment of the present invention.
Figure 2:
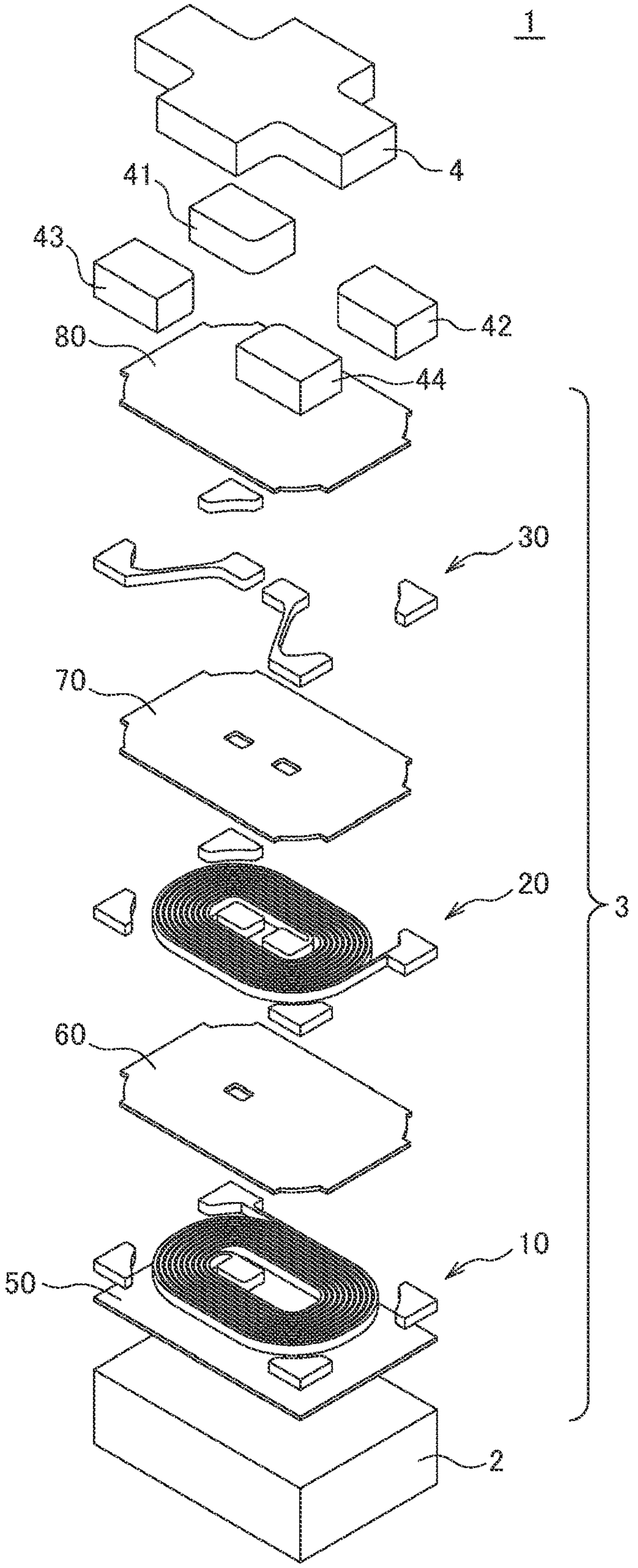
FIG. 2 is a schematic exploded perspective view of the coil component 1.

FIG. 1 is a schematic perspective view illustrating the outer appearance of a coil component 1 according to an embodiment of the present invention. FIG. 2 is a schematic exploded perspective view of the coil component 1.

The coil component 1 according to the present embodiment is a common mode filter and includes, as illustrated in FIGS. 1 and 2, a substrate 2, a coil layer 3 provided on the surface of the substrate 2, a magnetic resin layer 4 covering the coil layer 3, four terminal electrodes 41 to 44 connected to the coil layer 3. The substrate 2 is made of a magnetic material, such as ferrite. The substrate 2 functions as a magnetic path for a magnetic field generated from the coil layer 3 and has a role of ensuring the mechanical strength of the coil component 1. The magnetic resin layer 4 is made of a composite material obtained by dispersing magnetic powder made of a metallic magnetic material in a binder resin and functions as a magnetic path for a magnetic field generated from the coil layer 3. The terminal electrodes 41 to 44 are disposed at respective corners of the coil component 1 and are each embedded in the magnetic resin layer 4 such that the upper and the side surface thereof are exposed. Thus, the terminal electrodes 41 to 44 are each exposed to three surfaces of the coil component 1. Although not particularly limited, the terminal electrodes 41 to 44 are formed by a thick film plating method, and each of them is sufficiently larger in thickness than an electrode pattern formed by a sputtering method or a screen printing.

As illustrated in FIG. 2, the coil layer 3 includes insulating layers 50, 60, 70, and 80 and conductor layers 10, 20, and 30 formed respectively on the surfaces of the insulating layers 50, 60, and 70. The conductor layers 10, 20, and 30 are each made of a good conductor such as copper (Cu). The insulating layers 50, 60, 70, and 80 are each made of an insulating material such as resin. The insulating layer 50 is positioned in the lowermost layer and has a role of ensuring flatness by covering the surface of the substrate 2. The insulating layer 80 is positioned in the uppermost layer and has a role of separating the conductor layer 30 and the magnetic resin layer 4 from each other.

Figure 3:
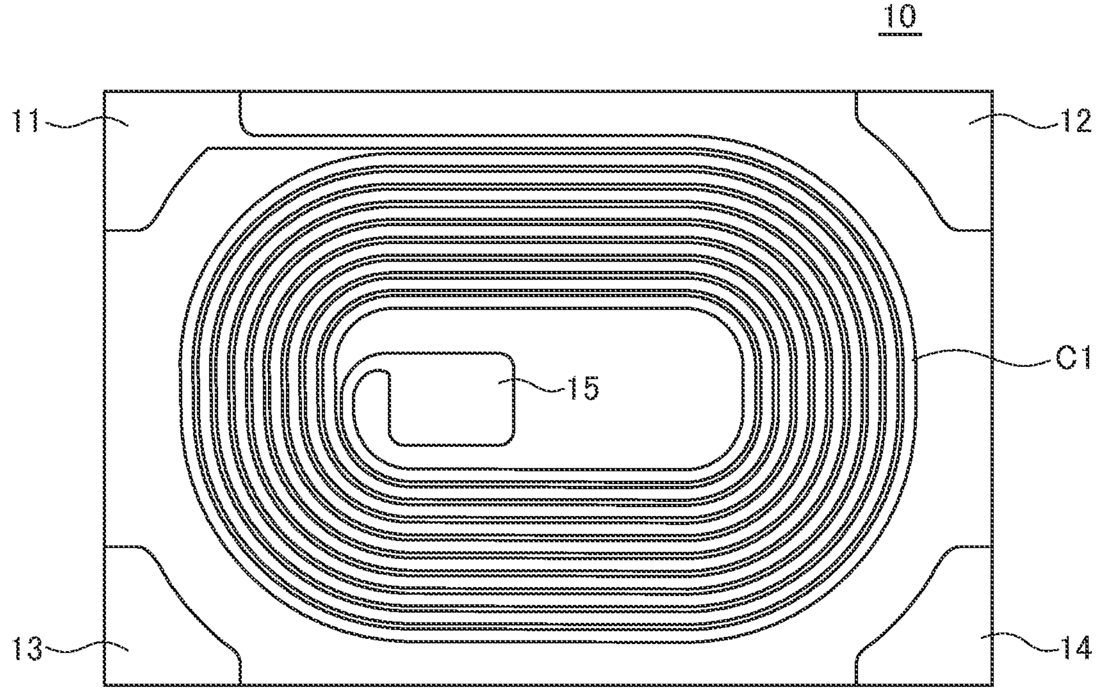
FIG. 3 is a schematic plan view illustrating a conductor layer 10.

The conductor layer 10 is formed on the surface of the insulating layer 50. As illustrated in FIG. 3, the conductor layer 10 includes a planar spiral coil C1 and connection patterns 11 to 15. The planar spiral coil C1 is a coil pattern wound in a plurality of turns. The outer peripheral end of the planar spiral coil C1 is connected to the connection pattern 11, and the inner peripheral end thereof is connected to the connection pattern 15. The remaining connection patterns 12 to 14 are not connected to any connection pattern in the same plane but are provided independently.

Figure 4:
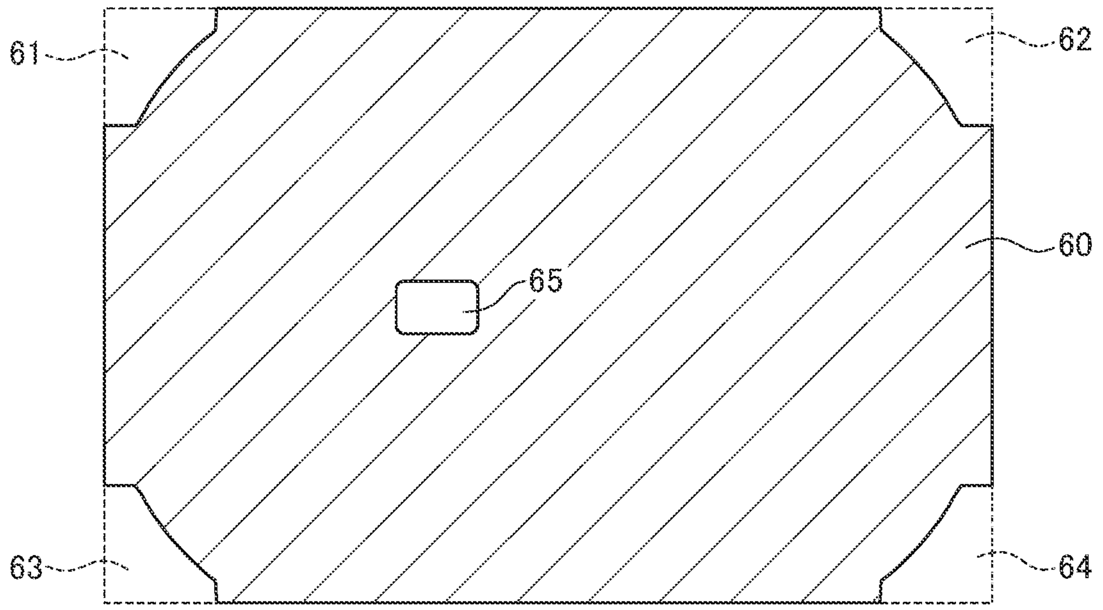
FIG. 4 is a schematic plan view illustrating an insulating layer 60.

The conductor layer 10 is covered with the insulating layer 60. As illustrated in FIG. 4, the insulating layer 60 has vias 61 to 65. The vias 61 to 65 are formed at positions overlapping the connection patterns 11 to 15, respectively, whereby the connection patterns 11 to 15 are exposed from the insulating layer 60 respectively through the vias 61 to 65.

Figure 5:
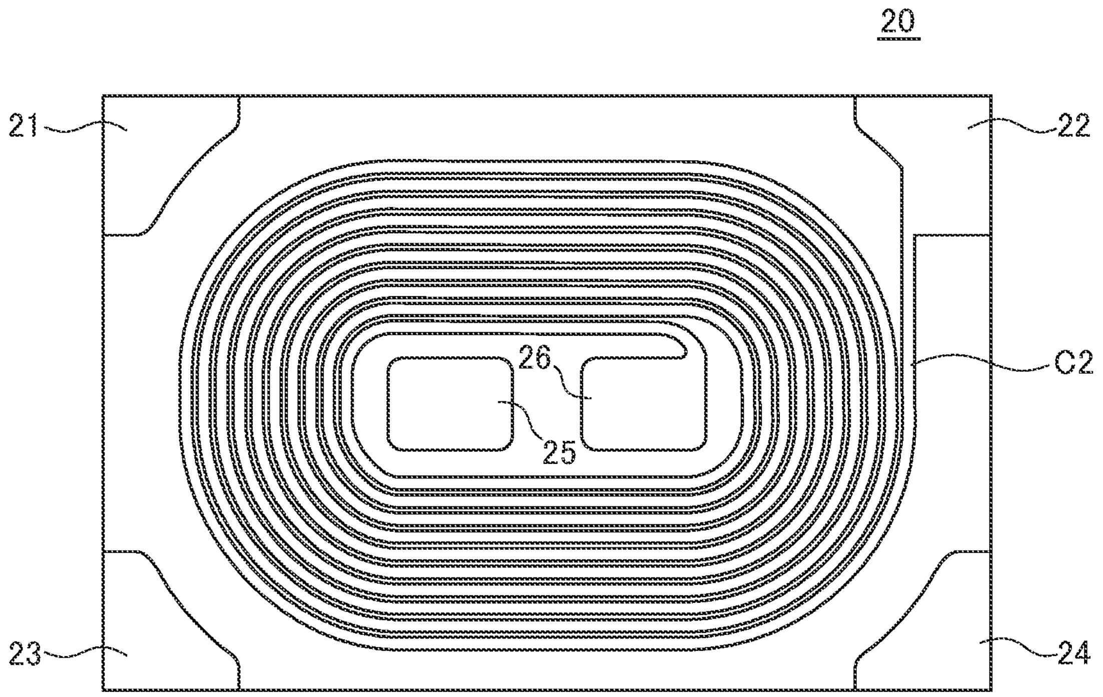
FIG. 5 is a schematic plan view illustrating a conductor layer 20.

The conductor layer 20 is formed on the surface of the insulating layer 60. As illustrated in FIG. 5, the conductor layer 20 includes a planar spiral coil C2 and connection patterns 21 to 26. The planar spiral coil C2 is a coil pattern wound in a plurality of turns so as to overlap the planar spiral coil C1 in a plan view. The outer peripheral end of the planar spiral coil C2 is connected to the connection pattern 22, and the inner peripheral end thereof is connected to the connection pattern 26. The remaining connection patterns 21 and 23 to 25 are not connected to any connection pattern in the same plane but are provided independently. The connection patterns 21 to 25 are provided at positions overlapping the vias 61 to 65, respectively, and are thus connected respectively to the connection patterns 11 to 15.

Figure 6:
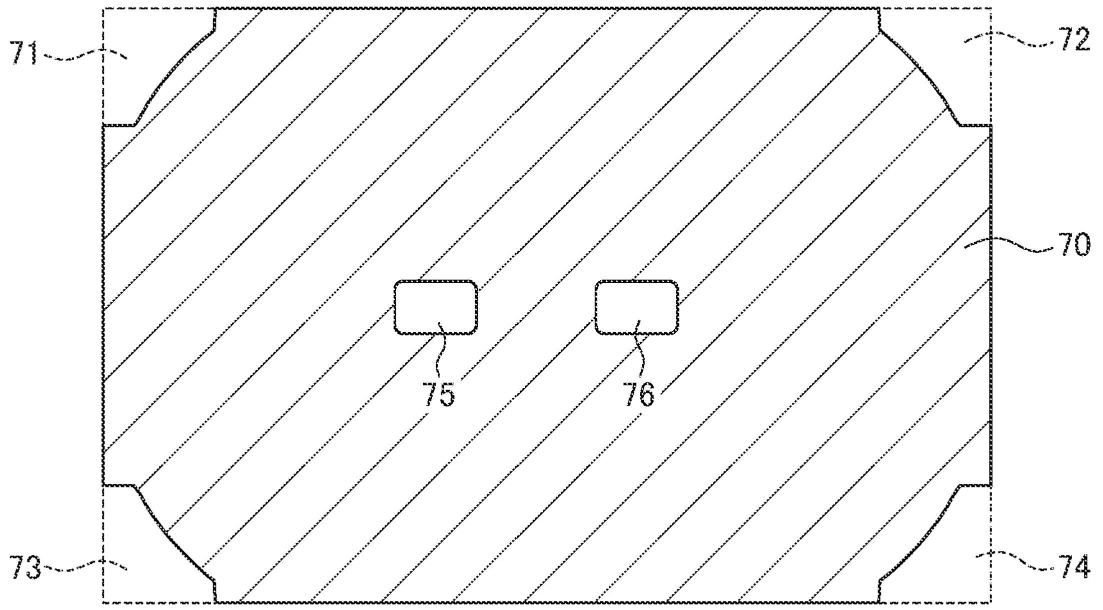
FIG. 6 is a schematic plan view illustrating an insulating layer 70.

The conductor layer 20 is covered with the insulating layer 70. As illustrated in FIG. 6, the insulating layer 70 has vias 71 to 76. The vias 71 to 76 are formed at positions overlapping the connection patterns 21 to 26, respectively, whereby the connection patterns 21 to 26 are exposed from the insulating layer 70 respectively through the vias 71 to 76.

Figure 7:
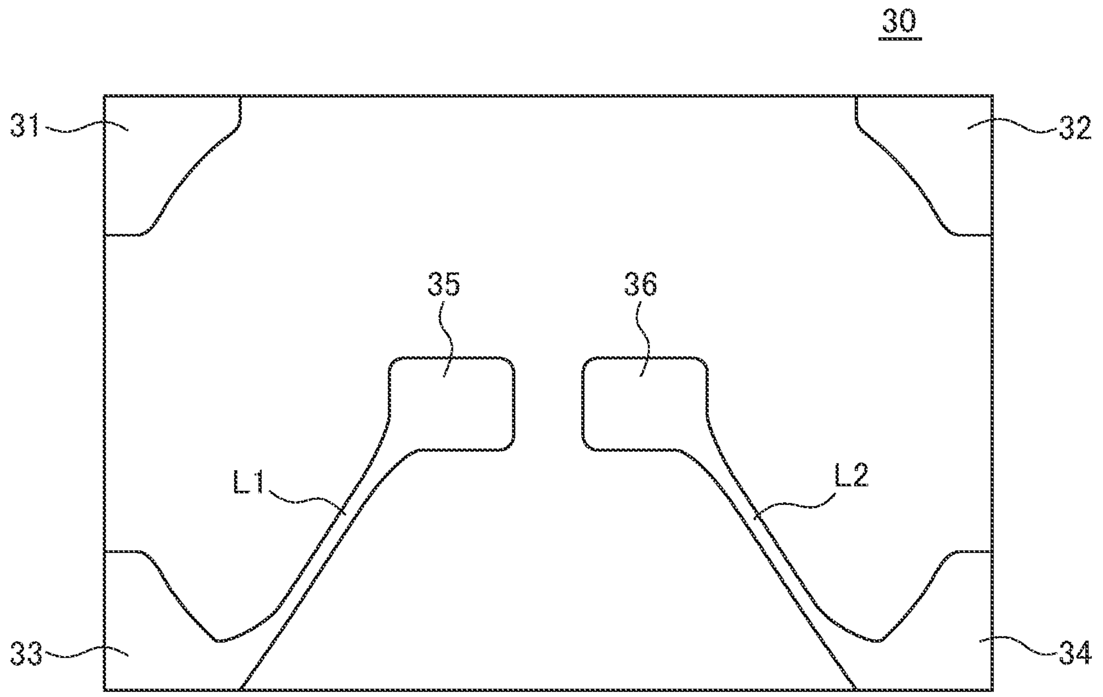
FIG. 7 is a schematic plan view illustrating a conductor layer 30.

The conductor layer 30 is formed on the surface of the insulating layer 70. As illustrated in FIG. 7, the conductor layer 30 includes lead-out patterns L1 and L2 and connection patterns 31 to 36. The lead-out pattern L1 connects the connection patterns 33 and 35, and the lead-out pattern L2 connects the connection patterns 34 and 36. The remaining connection patterns 31 and 32 are not connected to any connection pattern in the same plane but are provided independently. The connection patterns 31 to 36 are provided at positions overlapping the vias 71 to 76, respectively, and are thus connected respectively to the connection patterns 21 to 26.

Figure 8:
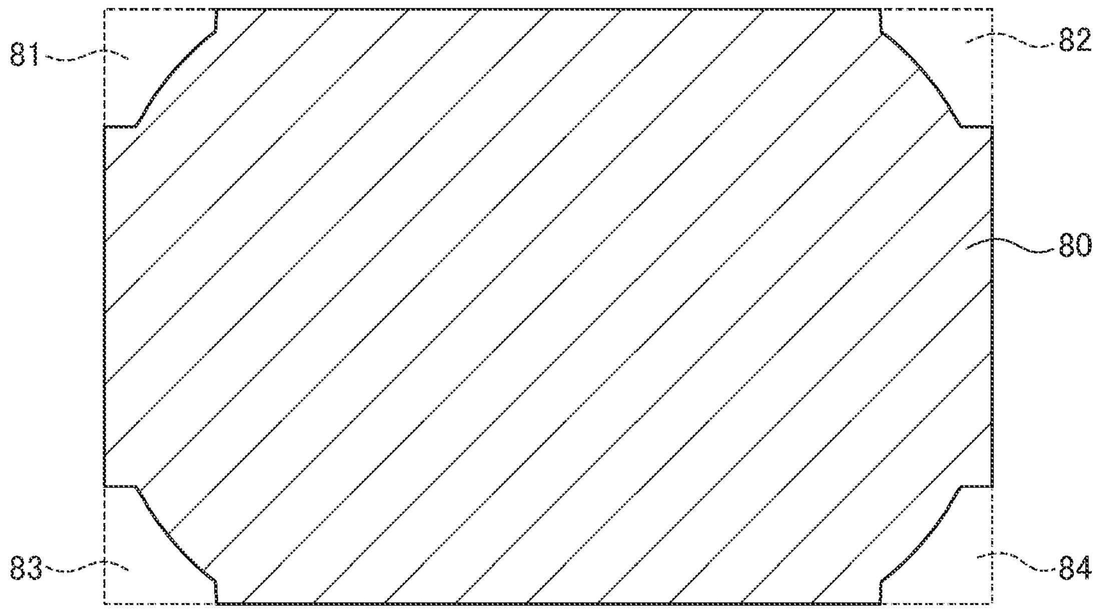
FIG. 8 is a schematic plan view illustrating an insulating layer 80.

The conductor layer 30 is covered with the insulating layer 80. As illustrated in FIG. 8, the insulating layer 80 has vias 81 to 84. The vias 81 to 84 are formed at positions overlapping the connection patterns 31 to 34, respectively, whereby the connection patterns 31 to 34 are exposed from the insulating layer 80 respectively through the vias 81 to 84.

The magnetic resin layer 4 and terminal electrodes 41 to 44 are provided on the surface of the insulating layer 80. The terminal electrodes 41 to 44 are provided at positions overlapping the vias 81 to 84, respectively, and are thus connected respectively to the connection patterns 31 to 34. As a result, the terminal electrode 41 is connected to the outer peripheral end of the planar spiral coil C1 through the connection patterns 31, 21, and 11, and the terminal electrode 42 is connected to the outer peripheral end of the planar spiral coil C2 through the connection patterns 32 and 22. The terminal electrode 43 is connected to the inner peripheral end of the planar spiral coil C1 through the connection pattern 33, lead-out pattern L1, and connection patterns 35, 25, and 15, and the terminal electrode 44 is connected to the inner peripheral end of the planar spiral coil C2 through the connection pattern 34, lead-out pattern L2, and connection patterns 36 and 26.

Figure 9:
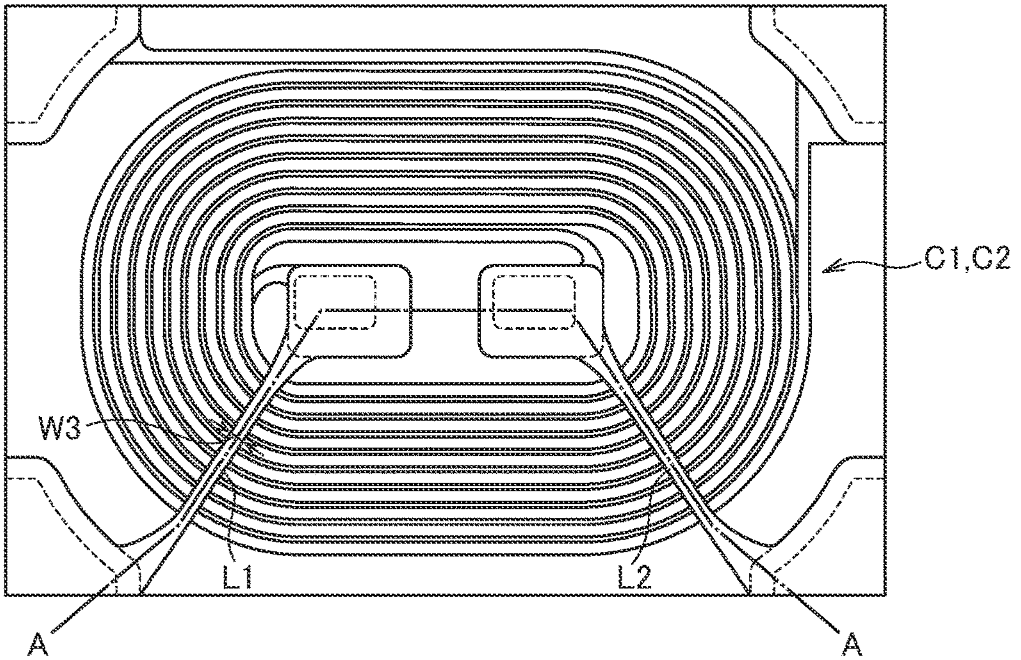
FIG. 9 is a schematic plan view illustrating a state where the conductor layers 10, 20, and 30 overlap one another.
Figure 10:
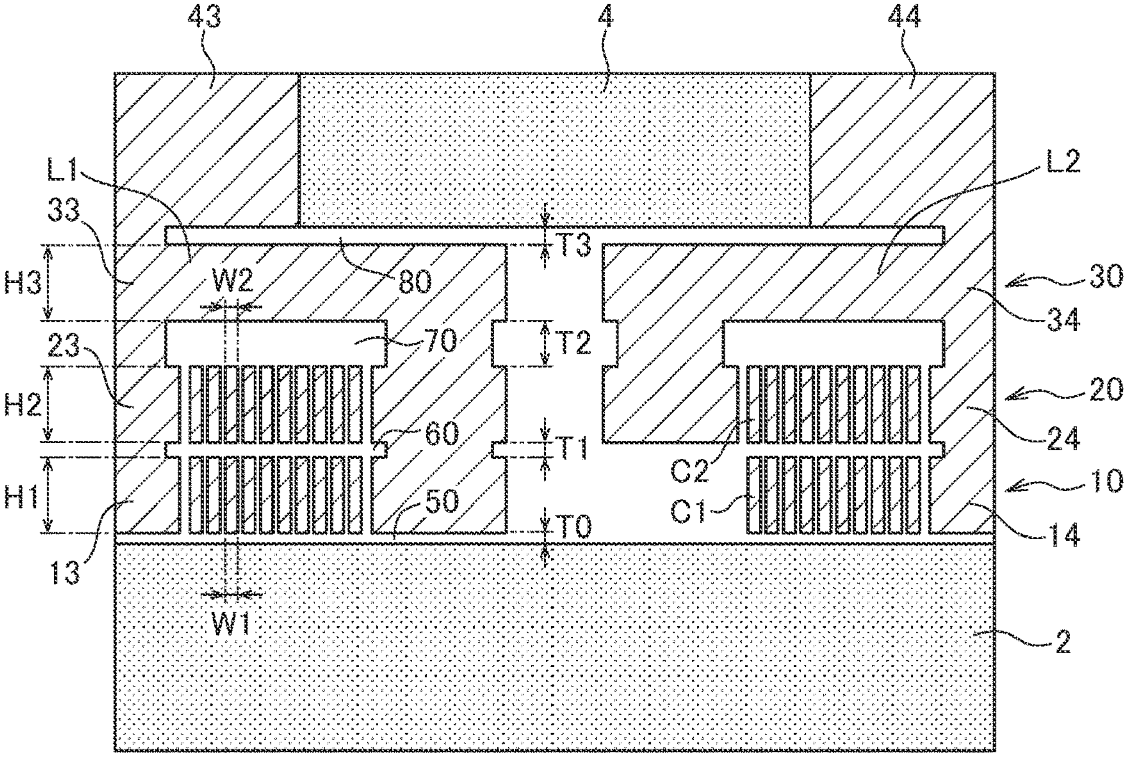
FIG. 10 is a schematic cross-sectional view taken along the line A-A in FIG. 9.

FIG. 9 is a schematic plan view illustrating a state where the conductor layers 10, 20, and 30 overlap one another. FIG. 10 is a schematic cross-sectional view taken along the line A-A in FIG. 9.

As illustrated in FIGS. 9 and 10, the planar spiral coil C2 substantially completely overlaps the planar spiral coil C1 through the insulating layer 60, and the lead-out patterns L1 and L2 cross the planar spiral coils C1 and C2 in a plan view through the insulating layer 70. Thus, the coil component 1 according to the present embodiment has a structure in which two planar spiral coils are stacked, thus making it possible to reduce floating capacitance as compared with a coil component having a structure in which four planar spiral coils are stacked.

Further, as illustrated in FIGS. 9 and 10, pattern widths of the planar spiral coil C1 in the thickness and radial directions are H1 and W1, respectively, pattern widths of the planar spiral coil C2 in the thickness and radial directions are H2 and W2, respectively, and pattern widths of each of the lead-out patterns L1 and L2 in the thickness direction and a direction perpendicular to the extending direction thereof are H3 and W3, respectively. The thicknesses of the insulating layers 50, 60, 70, and 80 are T0, T1, T2, and T3, respectively.

In the present embodiment, H1>W1 and H2>W2 are satisfied. That is, in each of the planar spiral coils C1 and C2, the thickness is larger than the pattern width. In other words, the planar spiral coils C1 and C2 each have an aspect ratio exceeding 1. This allows a sufficient number of turns and a sufficient cross-sectional area to be ensured even in the two-coil stacked structure. The thickness H1 and thickness H2 may be the same. Similarly, the width W1 and width W2 may be the same.

Further, in the present embodiment, T2>T1 is satisfied. This reduces floating capacitance generated between the planar spiral coil C2 and the lead-out patterns L1, L2. To sufficiently reduce the floating capacitance, the thickness T2 of the insulating layer 70 is preferably made 1.2 times the thickness T1 of the insulating layer 60. In addition, in the present embodiment, H3>W3 is satisfied. Thus, the overlapping itself between the planar spiral coil C2 and the lead-out patterns L1, L2 is reduced, whereby the floating capacitance generated between the planar spiral coil C2 and the lead-out patterns L1, L2 is further reduced.

The thickness T0 of the insulating layer 50 and the thickness T3 of the insulating layer 80 may be the same as the thickness T1 of the insulating layer 60. In this case, T2>T0, T1, T3 is satisfied.

As described above, the coil component 1 according to the present embodiment has a two-coil stacked structure constituted of the planar spiral coils C1 and C2 and can reduce the floating capacitance generated between the planar spiral coil C2 and the lead-out patterns L1 and L2, thus making it possible to enhance high-frequency characteristics such as mode conversion characteristics.

Figure 11:
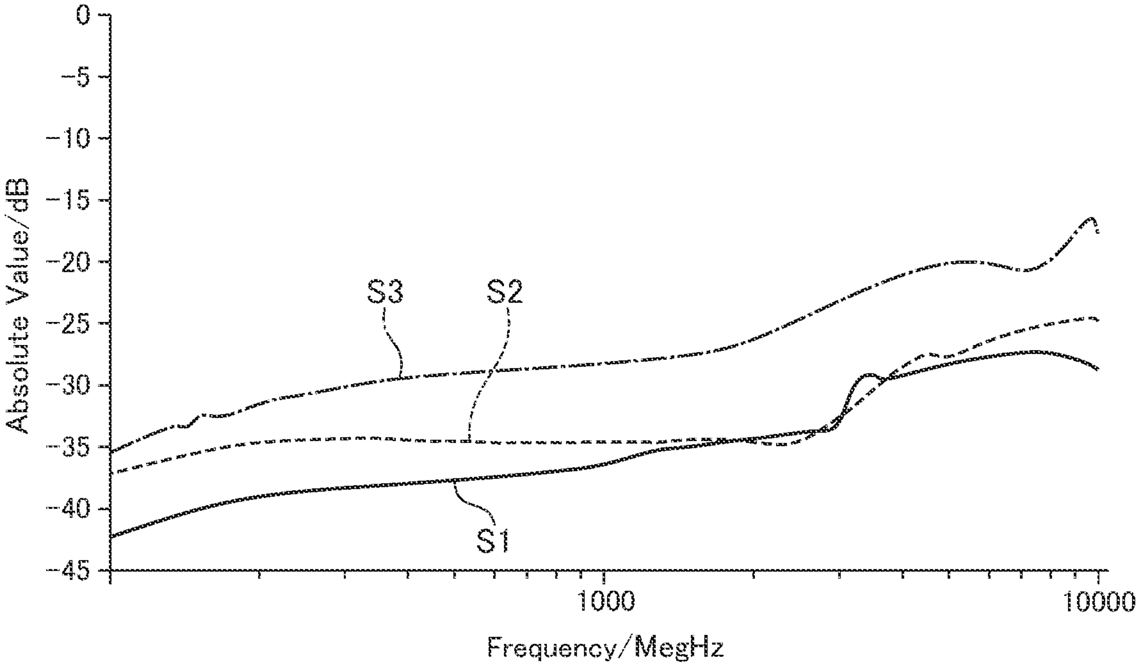
FIG. 11 is a graph illustrating the actual mode conversion characteristics (Scd21).

FIG. 11 is a graph illustrating the actual mode conversion characteristics (Scd21). A symbol S1 indicates the characteristics of the coil component 1 (T2=T1×1.2) according to the present embodiment, a symbol S2 indicates the characteristics of the coil component 1 when the thickness T2 of the insulating layer 70 is made the same as the thickness T1, and a symbol S3 indicates the characteristics of a coil component having a four-coil stacked structure. The above three samples have the same inductance characteristics.

As can been from FIG. 11, when the inductance characteristics are the same, the two-coil stacked structure can obtain better mode conversion characteristics than the four-coil stacked structure. In addition, as indicated by the symbol S1, when the thickness T2 of the insulating layer 70 is set to 1.2 times the thickness T1 of the insulating layer 60, the mode conversion characteristics are improved as compared with a case where T2=T1.

It is apparent that the present disclosure is not limited to the above embodiments, but may be modified and changed without departing from the scope and spirit of the disclosure.

For example, the insulating layer 70 may be made of a material having a dielectric constant lower than that of the insulating layer 60 so as to further reduce the floating capacitance generated between the planar spiral coil C2 and the lead-out patterns L1, L2.

What is claimed is:

1. A coil component comprising:
first, second, third, and fourth terminal electrodes;
a first planar spiral coil formed on a substrate, the first planar spiral coil having an outer peripheral end connected to the first terminal electrode;
a second planar spiral coil stacked on the first planar spiral coil through a first insulating layer, the second planar spiral coil having an outer peripheral end connected to the second terminal electrode; and
first and second lead-out patterns stacked on the second planar spiral coil through a second insulating layer,
wherein the first lead-out pattern connects the third terminal electrode and an inner peripheral end of the first planar spiral coil,
wherein the second lead-out pattern connects the fourth terminal electrode and an inner peripheral end of the second planar spiral coil, and
wherein the second insulating layer is thicker than the first insulating layer.

2. The coil component as claimed in claim 1, wherein each of the first and second planar spiral coils is larger in thickness than width.

3. The coil component as claimed in claim 1, wherein each of the first and second lead-out patterns is larger in thickness than width.

4. The coil component as claimed in claim 1, wherein a thickness of the second insulating layer is 1.2 times as large as or larger than a thickness of the first insulating layer.

5. The coil component as claimed in claim 1, wherein the second insulating layer has a dielectric constant lower than that of the first insulating layer.

6. A coil component comprising:
a first insulating layer;
a first conductor layer formed on the first insulating layer, the first conductor layer having a first coil pattern;
a second insulating layer formed on the first insulating layer so as to cover the first conductor layer;
a second conductor layer formed on the second insulating layer, the second conductor layer having a second coil pattern;
a third insulating layer formed on the second insulating layer so as to cover the second conductor layer; and
a third conductor layer formed on the third insulating layer, the third conductor layer having a first lead-out pattern connected to the first coil pattern and a second lead-out pattern connected to the second coil pattern,
wherein the third insulating layer is thicker than the second insulating layer.

7. The coil component as claimed in claim 6, wherein the third insulating layer is thicker than the first insulating layer.

8. The coil component as claimed in claim 6, further comprising a fourth insulating layer formed on the third insulating layer so as to cover the third conductor layer,
wherein the third insulating layer is thicker than the fourth insulating layer.

9. The coil component as claimed in claim 6, further comprising first, second, third, and fourth terminal electrodes,
wherein the first terminal electrode is connected to an outer peripheral end of the first coil pattern,
wherein the second terminal electrode is connected to an outer peripheral end of the second coil pattern,
wherein the third terminal electrode is connected to an inner peripheral end of the first coil pattern via the first lead-out pattern, and
wherein the fourth terminal electrode is connected to an inner peripheral end of the second coil pattern via the second lead-out pattern.

10. The coil component as claimed in claim 9, further comprising a fourth insulating layer provided between the third conductor layer and the first to fourth terminal electrodes,
wherein the third insulating layer is thicker than the fourth insulating layer.

11. The coil component as claimed in claim 6, wherein the first coil pattern is larger in thickness than width.

12. The coil component as claimed in claim 6, wherein the second coil pattern is larger in thickness than width.

13. The coil component as claimed in claim 6, wherein each of the first and second lead-out patterns is larger in thickness than width.

* * * * *